United States Patent

Elsner

[11] Patent Number: 4,475,651
[45] Date of Patent: Oct. 9, 1984

[54] ROLL-WRAPPING APPARATUS, METHOD AND INTERMEDIATE PRODUCT

[75] Inventor: Bertram F. Elsner, Hanover, Pa.

[73] Assignee: Elsner Engineering Works, Inc., Hanover, Pa.

[21] Appl. No.: 318,623

[22] Filed: Nov. 5, 1981

[51] Int. Cl.³ .............................................. B65D 85/66
[52] U.S. Cl. ................................. 206/389; 206/410; 206/497; 53/553
[58] Field of Search ............... 206/389, 410, 497, 459; 229/87 R, 87 C; 53/553, 399

[56] References Cited

U.S. PATENT DOCUMENTS

| | | | |
|---|---|---|---|
| 1,848,119 | 3/1932 | Fairchild | 206/410 |
| 2,019,401 | 10/1935 | Driver | 229/87 C |
| 2,296,830 | 9/1942 | Beals | 229/87 C |
| 2,906,399 | 9/1959 | Lysle et al. | 206/410 |
| 3,273,301 | 9/1966 | Anderson | 53/465 |
| 3,381,817 | 5/1968 | Harm | 206/410 |
| 3,524,583 | 8/1970 | Gregory | 229/87 C |
| 3,536,560 | 10/1970 | Vite et al. | 156/455 |
| 3,717,801 | 2/1973 | Silverberg | 361/234 |
| 3,820,929 | 7/1974 | Busby et al. | 425/174.8 E |
| 3,832,053 | 8/1974 | Goel et al. | 355/3 R |
| 3,892,614 | 7/1975 | Levy | 361/225 |
| 3,915,301 | 10/1975 | Gray et al. | 206/410 |
| 3,944,355 | 3/1976 | Matkan | 355/3 R |
| 3,955,481 | 5/1976 | Heitmann | 493/8 |
| 3,990,215 | 11/1976 | Elsner et al. | 53/182 R |
| 4,053,046 | 10/1977 | Roark | 229/87 C |
| 4,182,222 | 11/1980 | Stahl | 53/553 |
| 4,205,750 | 6/1980 | Dews | 206/497 |
| 4,300,681 | 11/1981 | Klygis et al. | 206/497 |
| 4,423,584 | 1/1984 | Elsner et al. | 53/553 |

FOREIGN PATENT DOCUMENTS 936903  1/1948  France .................. 206/410

OTHER PUBLICATIONS

Elsner et al., U.S. application for "Roll-Wrapping Apparatus with Label Inserter and Method", Ser. No. 234,572, Filed 2/13/81.

Primary Examiner—Joseph Man-Fu Moy
Assistant Examiner—David Thomas Fidei
Attorney, Agent, or Firm—Thomas Hooker

[57] ABSTRACT

A roll-wrapping apparatus and method where rolls are wrapped with an envelope of heat-shrink plastic film with a label positioned between the envelope and roll and electrostatically bonded to the film. The bond prevents misalignment of the label prior to heat shrinking of the film onto the roll.

5 Claims, 6 Drawing Figures

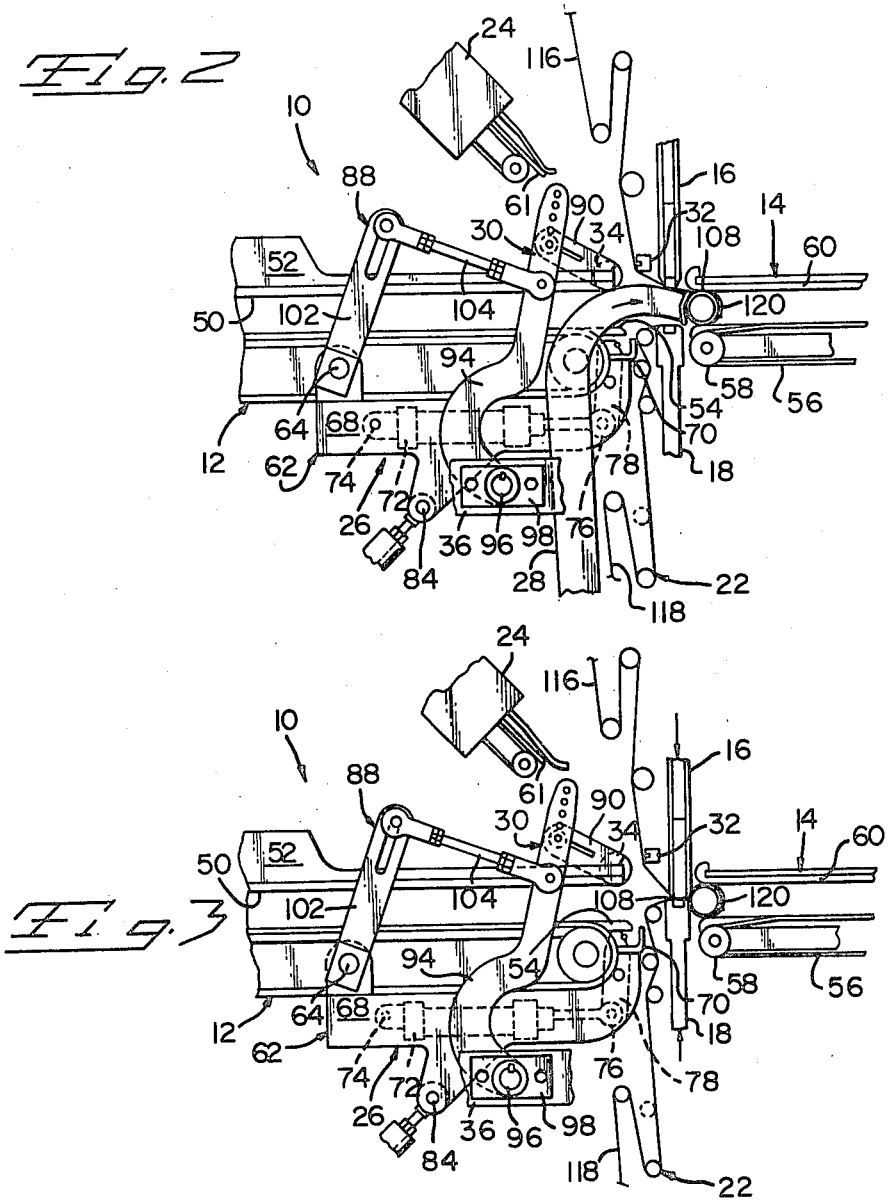

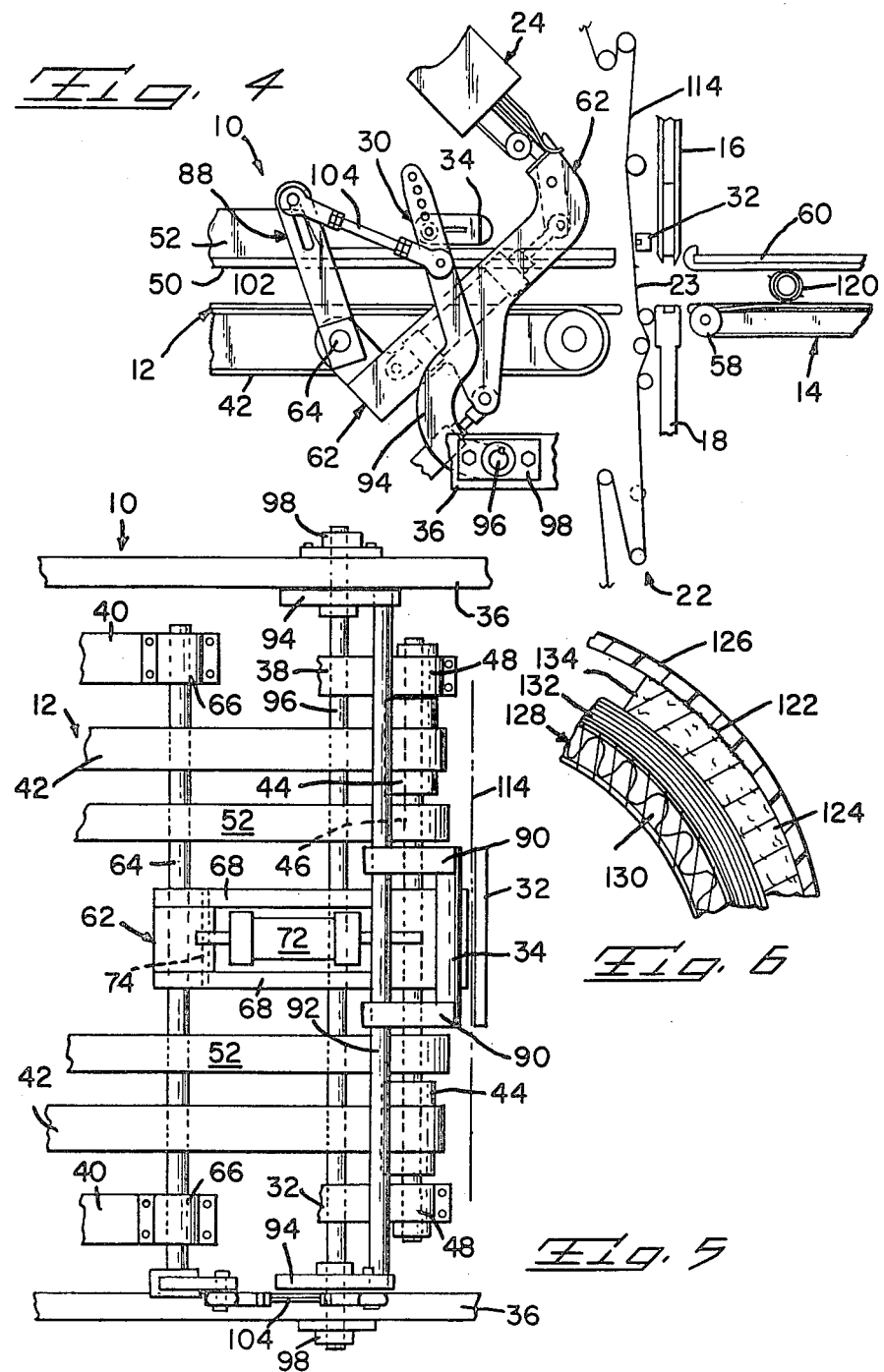

ROLL-WRAPPING APPARATUS, METHOD AND INTERMEDIATE PRODUCT

The invention relates to an apparatus and method for wrapping rolls, conventionally rolls of sheet material such as wrapping paper and the like wound on a core, by a loose envelope of heat-shrink film and with a label positioned between the envelope and the roll and bonded electrostatically to the film envelope. The electrostatic bond assures the label is held in the desired position until the envelope is heat-shrunk to tightly sandwich the label between the label and the roll. The electrostatic bond between the label and film is formed when the label is supported in a known position, prior to wrapping the film around the roll. The bond prevents undesired shifting of the label.

Co-pending Elsner et al U.S. patent application, Ser. No. 234,572, filed Feb. 13, 1981 for "Roll-Wrapping Apparatus with Label Inserter and Method" discloses a roll-wrapping machine for automatically positioning a label between an envelope of heat-shrink film formed around a roll and then shrinking the film to tightly confine the label in place on the roll. The film shrinking operation is performed at a station downstream from the work zone where the film is wrapped around the label and roll. During movement of the roll from the work zone to the heat-shrink station there is a possibility that the loosely confined label may shift from its desired orientation in which it was picked up and originally wrapped so that when the film is shrunk, the label is held in improper orientation. Labels may shift despite the use of roll hold-downs. An improperly oriented label makes the finished product unsightly and decreases its marketability.

The present invention is an improvement over the apparatus and method of the co-pending Elsner et al application by providing an electrostatic charging assembly which provides opposite electrostatic charges on the upper end of the label and the adjacent plastic heat-shrink film so that the charges create an electrostatic bond holding the label to the film. The label is held in a fixed jaw member in proper orientation when it is charged thereby assuring that the electrostatic bond holds it in proper orientation during wrapping around the roll and movement of the resultant package from the work zone to the heat-shrink station. Thus, the electrostatic bond between the label and the film guarantees the label is in the desired location when the film envelope surrounding the roll is shrunk to permanently sandwich the label against the roll. In the case of a rectangular label, the electrostatic bond may assure that the top and bottom edges of the label are parallel to the axis of the roll when the film envelope is shrunk in place.

In addition to the apparatus and method previously described, the invention also relates to an improved intermediate product comprising a roll, a loose plastic film envelope surrounding the roll and a label confined between the envelope and the roll and securely bonded in place to prevent misorientation prior to heat-shrinking of the envelope. In the envelope of the prior Elsner et al machine, the label is not bonded in place between the envelope and the roll. Hold-downs are used to maintain alignment of the label, but some movement may occur.

The electrostatic charging assembly used in the roll-wrapping apparatus includes conventional charging and grounding bars and charge generating circuits similar to those disclosed in U.S. Pat. No. 3,892,614 for "Electrostatic Laminating Apparatus and Method", assigned to the Simco Company, Inc., Lansdale, PA.

Other objects and features of the invention will become apparent as the description proceeds, especially when taken in conjunction with the accompanying drawings illustrating the invention, of which there are three sheets and one embodiment.

IN THE DRAWINGS

FIGS. 2, 3 and 4 are similar to FIG. 1 illustrating the operation of the apparatus;

FIG. 5 is a top view of the apparatus partially broken away; and

FIG. 6 is an enlarged sectional view illustrating part of a wrapped roll with the label electrostatically bonded to the film envelope prior to shrinking of the film.

DESCRIPTION OF THE INVENTION

Figure 1:
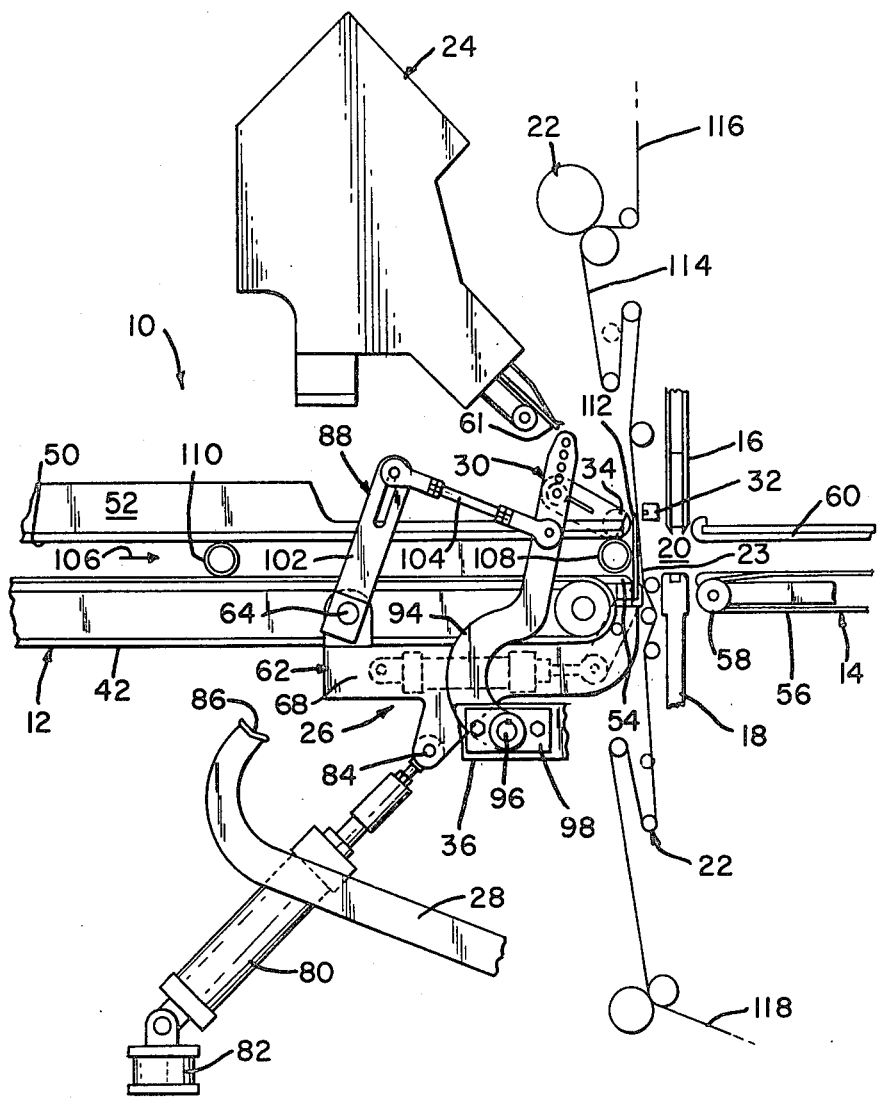
FIG. 1 is a side view, partially broken away, of a roll-wrapping apparatus according to the invention.

Roll-wrapping apparatus 10 includes a roll infeed conveyor 12, roll discharge conveyor 14 located downstream of the infeed conveyor and upper and lower film sealing jaws 16 and 18 located in a work zone 20 between the conveyors. Film feed assembly 22 maintains a taut curtain 23 of thermoplastic film extending across the work zone upstream of the sealing jaws.

Label feeder 24 is mounted on apparatus 10 above the infeed conveyor. Label transfer assembly 26 transfers labels from feeder 24 to the work zone immediately upstream of the film curtain maintained by assembly 22. A pair of pusher bars 28 feed rolls from the downstream end of conveyor 12 through the work zone 20 to the upstream end of discharge conveyor 14. Conveyor 14 extends from the work zone downstream to a heat shrink station (not illustrated).

An electrostatic charging assembly 30 includes a grounding bar 32 extending across the width of the film curtain on the downstream side of the curtain and an applicator bar 34 extending across the width of the upstream side of the curtain across from the grounding bar. The grounding bar is permanently mounted on apparatus 10 as illustrated while the charging bar is moveable between the positions illustrated in FIGS. 1 and 4 in response to movement of the label transfer assembly 26. Conventional electrostatic generators (not illustrated) energize bars 32 and 34 so that opposite polarity electrostatic charges are generated by the bars and flowed toward the adjacent plastic film. The bars and generators may be like those shown in U.S. Pat. No. 3,892,614.

Referring to FIGS. 1 and 5, apparatus 10 includes a frame having a number of pairs of support rails 36, 38 and 40 located on opposite sides of the machine. The roll infeed conveyor 12 includes a number of roll support belts 42 which are wrapped around pulleys 44 on shaft 46 at the downstream end of the infeed conveyor. Shaft 46 is journaled in bearings 48 on rails 38. The upper runs of belts 42 are moved downstream by a suitable drive (not illustrated). Resilient roll hold-downs 50 are supported on the lower surfaces of upper rails 52. A roll support platform 54 extends along the upper runs of belts 42 a distance beyond the downstream ends of the belts to support rolls as they are moved toward the work zone 20.

Discharge conveyor 14 includes a number of discharge belts 56 which extend around idler pulleys 58 at the upstream end of the conveyor. Pulleys 58 may be moved up and down between the positions of FIGS. 3 and 4. Discharge conveyor roll hold-downs 60, similar to hold-downs 50, are located above the discharge conveyor. Suitable drive means (not illustrated) lower and raise sealing jaws 16 and 18 to seal a loose envelope of film around a roll and re-establish the film curtain extending across the work zone 20.

Label feeder 24 automatically feeds individual labels 61 to a pickup position located above and slightly upstream of the work zone. See FIG. 1. Upon withdrawal of the label from the pickup position, another label is automatically fed to the pickup position.

The label transfer assembly 26 includes a pivot arm 62 rigidly secured on cross shaft 64 which is in turn mounted in bearings 66 on rails 40. The arm 62 includes a pair of spaced side plates 68 with a fixed jaw member 70 extending between the ends of the plates away from shaft 64. Air cylinder 72 is located between plates 68 with one end of the air cylinder pivotally mounted on a pin 74 extending between the plates and the rod end of the cylinder 76 mounted to the lower end of a pivot jaw member 78. Retraction of the air cylinder from the position shown in FIG. 3 moves the upper end of jaw member 78 against fixed jaw member 70 to grasp a label seated on the jaw member 70. The fixed end of pivot arm air cylinder 80 is attached to frame member 82 and the piston rod of the air cylinder is attached to plates 68 at cross pin 84. Extension and retraction of the cylinder 80 moves the label transfer assembly between the positions illustrated in FIGS. 1 and 4.

The lower ends of pusher bars 28 are pivotally attached to the apparatus 10 so that bar drive means (not illustrated) moves the bars between the positions of FIGS. 1 and 2 to pick up a roll fed to support platform 54 and move the roll through the work zone 20 to the discharge conveyor 14. Bars 28 include V-shaped ends 86 adapted to receive and push the roll downstream.

In addition to bars 32 and 34, the electrostatic charging assembly includes a shifting mechanism 88 for charging bar 34. The shifting mechanism includes a pair of arms 90 extending from the charging bar to support shaft 92 which extends across the width of apparatus 10 and is adjustably secured at its ends to the upper ends of a pair of pivot arms 94. The lower ends of these arms are mounted on cross shaft 96 which extends into bearings 98 on rails 36. A series of mounting holes 100 are provided on the free ends of arms 94 to permit mounting of shaft 92 in different positions dependent upon the geometry of the particular label being positioned within the roll wrapping. Likewise, the angular position of the arms 90 with respect to shaft 92 may be adjusted as required.

Radial arm 102 is carried on one end of shaft 64 and projects upwardly from the shaft generally parallel to the adjacent pivot arm 94. A link 104 joins arms 102 and 94 such that rotation of the pivot arm 62 from the position shown in FIG. 1 to the position shown in FIG. 4 correspondingly rotates arm 102 so that arms 94 are rotated in the same direction as the pivot arm and charging bar 34 is withdrawn from the path of movement of the arm 62 toward label inserter 24. FIG. 4 illustrates the arm 62 in the fully raised position with the charging bar 34 retracted away from the work zone.

OPERATION OF THE ROLL-WRAPPING APPARATUS

During operation of apparatus 10 belts 42 are continuously driven to move the upper runs downstream in the direction of arrow 106 shown in FIG. 1. A series of spaced rolls 108, 110 are moved downstream by the belts 42, between the upper runs of the belts and the hold-downs 50. Each roll is delivered by the belts to the support platform 54. In FIG. 1, roll 108 has moved the platform while next upstream roll 110 is being moved downstream toward the platform. Following movement of roll 108 through the work zone 20 to form a wrapped, sealed film envelope surrounding the roll with a label confined between the film envelope and the roll and an electrostatic bond between the label and the envelope, the wrapped roll is delivered to the mouth of the discharge conveyor 14 and the idler pulleys 58 are raised to confine the wrapped roll between belts 56 and hold-down 60 so that the downstream moving belts 56 move the roll to the heat shrink station.

Following discharge of a roll from the work zone, cylinder 80 is extended to rotate pivot arm 62 up from the position of FIG. 1 to that of FIG. 4. When in this position, the label 61 presented by label feeder 24 extends into the open space between the jaw members 70 and 78. Cylinder 72 is then retracted to move member 78 against fixed member 70 and clamp the presented label between the members. The cylinder 80 is then retracted to return the pivot arm to the position of FIG. 1 with the label extending across the downstream mouth of the infeed conveyor on the left of the work zone 20 as shown in FIG. 1. The label is immediately upstream of the film curtain 23 extending across the work zone. The fixed jaw member holds the label with the top edge parallel to the axis of the rolls moving through the machine. Cylinder 72 is extended.

During raising of the pivot arm 62, the bar 34 is automatically retracted by shifting mechanism 88. When the pivot arm 62 is returned to the retracted position, the charging bar 34 is again located immediately upstream of the top edge of the label. The grounding bar 32 is located on the other side of the curtain opposite the charging bar. During operation of apparatus 10 the grounding bar 32 and charging bar 34 are powered through conventional electrostatic charging circuitry (not illustrated) so that the air between bar 34 and the top label 112 is charged with ions of one polarity and the air between bar 32 and the adjacent thermoplastic wrapping film 114 is filled with ions of the opposite polarity. The different polarity ions collect on the top of label 112 and on the film 114 opposite the top of the label to form an electrostatic bond between the label and the film. The bond tightly holds the top of the label in place on the film. The effective net overall charge on the label and film is zero so that other objects are not attracted to or repelled by the charges which hold the label in place on the film.

Electrostatic bonding of the label to the film occurs immediately upon lowering of pivot arm 62 to the position of FIG. 1 and the resultant return of charging bar 34 to the position adjacent the top of label 112. Upon retraction of cylinder 80, pusher bars 28 are rotated up from the position of FIG. 1 to the position of FIG. 2 where ends 86 engage the roll 108 and move it downstream through the work zone 20. The film feed assembly 22 maintains tension on the film 114 extending across the work zone so that the film and the label secured to the film are wrapped around the roll. During this operation, the electrostatic bond between the label and the film accurately holds the label in place on the film. The film required to form the wrap around the roll is fed to the work area from upper and lower film supplies 116 and 118, as required.

Following pushing of the roll 108 from platform 54, through the work zone and to the upstream end of the discharge conveyor 14 as shown in FIG. 2, pusher bars 28 are retracted and sealing jaws 16 and 18 are extended into the work zone to seal together the upper and lower sides of the film wrapped around the roll. See FIG. 3. The jaws form a first seal adjacent the roll and a second seal remote from the roll. The film between the seals is then automatically severed. In this way, the first seal forms a film envelope completely surrounding the roll with the label located between the envelope and the roll. The second seal reconnects the upper and lower films to re-establish the film curtain 23 extending across the work zone 20.

Upon forming of the seals and severing of the film between the seals, jaws 16 and 18 open and the film feed assembly 22 re-establishes the taut curtain extending across the work zone. Idler pulleys 58 are then raised to bring the upper runs of belts 56 into contact with the bottom of the wrapped roll and the roll is rotated against hold-downs 60 downstream from the work area to the heat shrink station where the film envelope surrounding the roll is shrunk onto the roll so that the label is tightly sandwiched between the film and the roll.

The film feed assembly 22 maintains film curtain 23 under tension during movement of the roll through the work zone and closure of the sealing jaws 16 and 18 to form the two seals. When the first seal is formed adjacent the upstream end of the roll, the resulting film envelope 120 has sufficient looseness or slack in it to allow a label freely positioned between the envelope and the roll to shift position and become misaligned during movement of the roll to the heat shrink station. At the shrink station, the film envelope is shrunk tightly onto the roll to hold the label in its final position. If the label has become shifted during movement from the orienting jaw member 70 to the heat shrink station, the surrounding envelope will shrink and permanently hold the label in the undesired shifted position.

By forming an electrostatic bond between the label and the film prior to wrapping the film around the roll and forming of the envelope 120, the position of the label is fixed relative to the film with the upper and lower label edges parallel to the roll axis. As shown in FIG. 6, an electrostatic bond is formed in area 122 to secure the upper edge of label 124 to the adjacent surrounding plastic film envelope 126. The label and film surround a roll 128 which may include a cylindrical cardboard core 130 and a number of layers of wrapping paper or the like 132 wound on the core. The upper edge 134 of the label extends parallel to the axis of the roll. In practice, the sealed, unshrunk, plastic envelope 126 is slightly larger than the roll so that there may be a slight space between the label and the film and roll away from the bond 122. Shrinking of the envelope on to the roll eliminates this spacing and tightly sandwiches the label in place on the roll.

The electrostatic bond between the envelope and the label extends axially along the top edge only of the label. The remaining area of the label is not attached to the film so that when the film is shrunk it slides across the fixed size label. A large area bond between the label and film is undesirable since shrinking of the film tends to buckle the label and film to form a rippled, unappealing package.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim my invention is:

1. An intermediate product comprising a roll, a loose continuous envelope formed of transparent heat shrink film completely surrounding the circumference of the roll, a label formed of non-heat shrink material confined between the roll and the envelope and a bond securing part of the label to the envelope, the remainder of the label being free of the envelope, whereby the bond holds the label in position on the envelope and the film slides across the remainder of the label without buckling as the envelope is shrunk onto the roll.

2. An intermediate product as in claim 1 where said part of the label is electrostatically bonded to the envelope.

3. An intermediate product as in claim 2 wherein the label is free of the roll.

4. An intermediate product as in claim 3 wherein the electrostatic bond extends along an edge of the label.

5. An intermediate product as in claim 4 wherein said edge of the label is straight and extends parallel to the axis of the roll.

* * * * *